United States Patent [19]

Siegel

[11] Patent Number: 5,720,208

[45] Date of Patent: Feb. 24, 1998

[54] SPUR CENTER APPARATUS

[76] Inventor: Jonathan B. Siegel, P.O. Box 6052, West Franklin, N.H. 03235

[21] Appl. No.: 668,539

[22] Filed: Jun. 21, 1996

[51] Int. Cl.⁶ .................................................. B23B 23/04
[52] U.S. Cl. ........................................... 82/150; 82/148
[58] Field of Search .......................... 82/170, 150, 151, 82/148

[56] References Cited

U.S. PATENT DOCUMENTS

| 2,402,979 | 7/1946 | Barto | 82/150 |
| 3,071,996 | 1/1963 | Rohm | 82/150 |
| 3,518,904 | 7/1970 | Rohm | 82/150 |
| 5,000,068 | 3/1991 | Knabel | 82/148 |

*Primary Examiner*—Daniel W. Howell
*Assistant Examiner*—Mark Williams
*Attorney, Agent, or Firm*—William B. Ritchie

[57] ABSTRACT

An adjustable spur center device for use with lathe machines. The spur center features easily interchangeable center points, one that can be either extended or retracted without removing the spur center from the lathe or dismounting the workpiece, and the other a spring-loaded version that permits an operator to remove or insert a workpiece without having to stop the rotation of the spindle. The spur center also features individually adjustable spurs that can be easily removed for resharpening or replacement.

6 Claims, 5 Drawing Sheets

SPUR CENTER APPARATUS

BACKGROUND OF THE INVENTION

1. Field of the Invention

This invention relates to an apparatus for holding a workpiece of wood or similar material in a lathe as it rotates, and more specifically to a highly adjustable apparatus treat is capable of accommodating a variety of material types and sizes.

2. Description of Related Art

Holding devices used in conjunction with lathe machines for holding a workpiece between the head stock and tail stock of the lathe are typically called spur centers or drive centers. These devices are intended to hold a workpiece in place as the lathe rotates, such that the device prevents the workpiece from coming loose as the user applies the stress against the workpiece through the cutting tools. A typical prior art spur center is shown in FIG. 1. The spur center 72 provides a tapered shank 75 featuring one of the Morse Taper sizes that is designed to fit into the head stock spindle end. The Morse Taper system has become universally accepted for wood lathes since about 1900.

Center point 73 is inserted into the wood material until four spurs 74 contact the piece that is to be worked. Thus, the spur must perform two principle functions: 1) center the piece within the points of attachment to the lathe, 2) impart rotation to the piece by holding the piece so that it will rotate with the rotation of the lathe without slipping even when under substantial stress. Failure to properly center the piece or hold it without slipping causes uneven rotation and, consequently, damage to the workpiece.

Ideally, the center point 73 is inserted into a previously marked center point on the wood that corresponds to the preferred center of rotation of the piece while it is being worked upon. Further, spurs 74 must firmly hold the piece so that there is no slippage between the workpiece and the lathe, even when the workpiece is undergoing heavy cuts.

The prior art spur center shown in FIG. 1 suffers from many deficiencies. First, the variation of hardness of woods within a workpiece from one "ring" to another causes center point 73 to seek its "own center" away from the point marked by the lathe operator to an adjacent layer of less dense wood. The degree of hardness variation across the layers as well as the thickness of adjacent layers differs considerably from one species of wood to another. Considerable centering adjustment is required to ensure that the workpiece is rotating on the preferred center. Frequently, adjustments must be made in the position of the center point in the workpiece because of the problem noted above, or because the workpiece is slightly warped (off axis). In order to make such a change, the center point must be lengthened. To accomplish this adjustment using prior art spur centers, the lathe must be stopped, the tail stock loosed, the piece removed, the spur center removed from the head stock, the center point lengthened, the spur center replaced, the workpiece re-inserted, the tail stock tightened, the lathe started, and the new adjustment evaluated. This is considerably time consuming and inconvenient, especially when working with a large workpiece or any workpiece having characteristics that require numerous adjustments.

Once centered, the center point 73 plays no role in the rotation of the workpiece. The tailstock is tightened so that center point 73 is forced further into the workpiece until the workpiece engages spurs 74. One major problem encountered when using the prior art spur center is that different materials require different lengths of center points to effectively position the workpiece. The center point can be either too long or too short for the material that is to be cut. For a heavy workpiece in soft wood, or other materials having a similar density, a long center point is preferred. For light pieces of very hard wood, or other material with similar characteristics, a short center point is preferred. If the material is very dense, it is difficult to force the center point far enough into the material so that the spurs will engage. In this case, the workpiece would slip. If the operator tries to compensate by tightening pressure between the head stock and the tail stock center points, this will produce additional stress on the bearings of the lathe and cause flexing of the workpiece, neither of which is desirable.

Various attempts have been made to solve some of the problems noted above. For decades, Sears/Craftsman has made a spur center with a replaceable point that was not adjustable. However, there was no source for extra points. Delta/Rockwell also has made a spur center with an adjustable point but the adjustability is limited to retraction by loosening a set screw. The point cannot be extended unless the workpiece is dismounted and the spur center removed from the headstock spindle.

Considered U.S. Pat. No. 2,333,055, issued to Terrell on Oct. 26, 1943, discloses a driving center which is designed primarily for mounting work which has been pre-drilled with a through hole. Due to the complexity of the design, the unit must be substantially longer that the typical prior art spur center 72 and manufacturing costs are prohibitive. It is intended that the user will set the center point within the pre-drilled hole and a knife edged sleeve along with five driving dogs that will make contact with the workpiece. One difficulty with this device is that it does not provide a means for adjustment once the workpiece has been set on the driving center. Not considered U.S. Pat. No. 4,398,579, issued to Holdahl et al. on Aug. 16, 1983, discloses another type of lathe work center. Holdahl et al. discloses a center with integral spurs located on a ring. This two-part device attempts to solve the mounting and dismounting of the workpiece while maintaining the centering. Two "work centering devices" must be purchased for every workpiece (one for each end) for a given job. Neither the center nor the spurs allow for any type of adjustment in positioning.

Considered U.S. Pat. No. 2,923,328, issued to Colledge on Feb. 2, 1960, discloses still another variation of a driving head for a lathe. The Colledge disclosure features a head with three prongs located within the head. The Colledge center point overhangs the shank by a considerable distance, thus decreasing the stability of the device. As with Terrell, this device is designed primarily for a workpiece which has been pre-bored with a through hole.

Nothing in the prior art provides a spur center that has an adjustable center point that can be adjusted while the workpiece remains mounted, that can also be fitted with a spring-loaded version, that will permit safe and easy removal of the workpiece while the spindle is in motion, and has easily replaceable and sharpenable spurs that can be independently adjusted as to length.

SUMMARY OF THE INVENTION

It is an aspect of the invention to provide a spur center for use with a lathe that can accommodate a wide range of different types and sizes of workpieces.

It is still yet another aspect of the invention to provide a spur center for use with a lathe that prevents slippage of the workpiece without having to overtighten the centers.

It is another aspect of the invention to provide a spur center for use with a lathe that can be easily and inexpensively manufactured.

It is still another aspect of the invention to provide a spur center for use with a lathe that has a center point that can be adjusted for length with the workpiece still mounted.

It is another aspect of the invention to provide a spur center for use with a lathe that can be fitted with a spring loaded center point.

It is still another aspect of the invention to provide a spur center for use with a lathe that provides for safe removal of the workpiece while the spindle is in motion.

It is still another aspect of the invention to provide a spur center for use with a lathe that has spurs that are easily removed for sharpening or replacement.

Another aspect of the invention is to provide a spur center for use with a lathe that has two easily interchangeable center points; one that is adjustable and the other that is spring-loaded.

It is still another aspect of the invention to provide a spur center for use with a lathe that can change center points by loosening a dog-point screw.

It is still another aspect of the invention to provide a spur center for use with a lathe that permits the workpiece to be safely removed and inserted while the spindle is in motion.

It is still another aspect of the invention to provide a spur center for use with a lathe that has an adjustable center point that can be adjusted from the side of the spur center via an adjustment screw so that the center point can be retracted while the tailstock ram is advanced thus ensuring full engagement of the spurs.

It is another aspect of the invention to provide a spur center for use with a lathe having spurs whose length is individually adjustable using its own "push screw".

It is still another aspect of the invention to provide a spur center for use with a lathe that can be easily changed from a four spur apparatus to a two spur apparatus.

Another aspect of the invention is to provide a spur center for use with a lathe whose center point can be extended or retracted without dismounting the workpiece.

It is still another aspect of the invention to provide a spur center for use with a lathe that has a body that is drilled through so that a center point that becomes stuck can be easily removed by pushing from the open end.

It is still another aspect of the invention to provide a spur center for use with a lathe that eliminates the problem of having the spurs not firmly engaging the workpiece by having a retractable center point that will allow the spurs to receive all axial force from the head stock and tail stock.

It is still another aspect of the invention to provide a spur center for use with a lathe that enables a workpiece to be turned from end to end without stopping the spindle.

It is still another aspect of the invention to provide a spur center for use with a lathe having a spring loaded center point that allows for stopping the rotation of the workpiece by a slight backing off of the tailstock so that the center point pushes the workpiece away from the spurs so that the workpiece can be easily stopped by hand.

It is still another aspect of the invention to provide a spur center for use with a lathe that can be easily manufactured to fit any Morse Taper #1, #2, #3.

Finally, it is an aspect of the invention to provide a spur center for use with a lathe that has spurs that can have the length easily and independently adjusted.

The present invention includes a body with a tapered end and a head end. The tapered end is secured to a lathe device. A conical center point and at least two spur points radially positioned around the center point are located within the head end of the body. Both the center point and the spurs are adjustable. The center point is positioned to contact the center of the workpiece. Once the center point is positioned, it is adjusted towards the head end such that the spurs contact the workpiece. The spurs and the counterpoint are then adjusted so that the center point rests against the workpiece and the spurs securely engage the workpiece. Once the apparatus is properly position, the spurs will cause the workpiece to rotate.

DETAILED DESCRIPTION OF THE INVENTION

Figure 1:
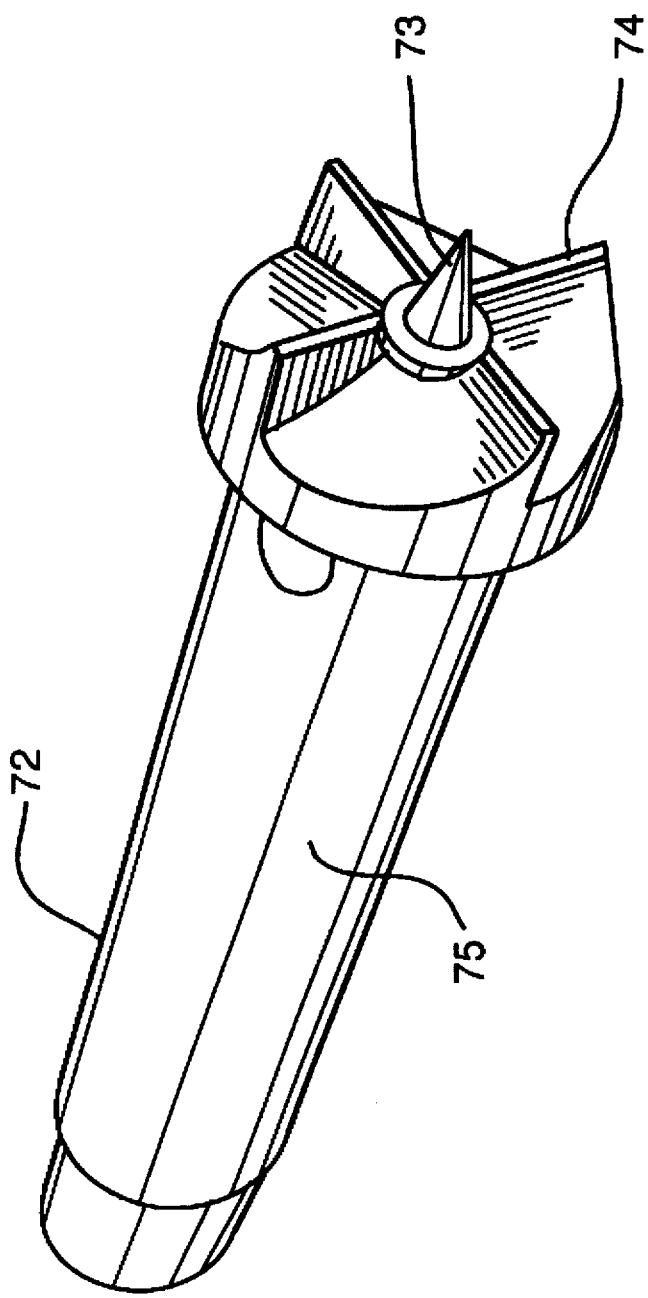
FIG. 1 is an isometric view of the typical prior art spur center.
Figure 2:
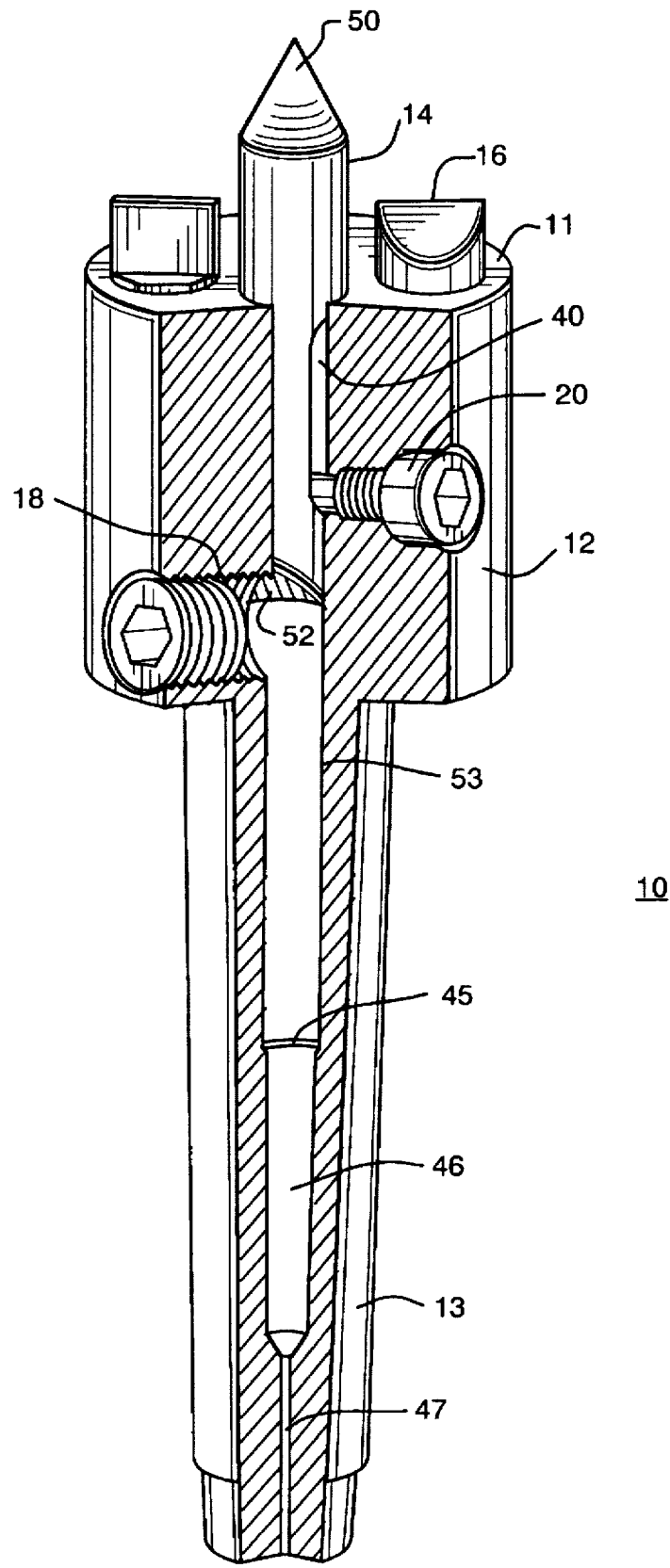
FIG. 2 is a partial cut away view of the spur center apparatus with the adjustable center point in accordance with the invention.

FIG. 2 is a partial cut away view of the spur center 10 with the adjustable center point 14 in position. Body 12 comprises shank 13 and head 11. While the dimensions are not critical, the size should be small enough to be conveniently handled and not get in the way as well as maintain the stability of the spurs and center point. All materials should be consistent with metals used for lathe machinery that are well known in the art. Body 12 is preferably about 4 inches long. Head 11 is preferably about an inch and a quarter long and a little less than an inch and a half in diameter. Shank 13, about 4 inches long, is tapered to fit into the headstock end of a lathe using one of the Morse Taper sizes #1, #2, #3. Preferably, size #2 would be used since this will fit most lathes as is. Further, this size can be made to fit lathes with MT #3 by using a reducing sleeve. This size will not fit lathes which are made for MT #1. Head 11 of body 12 supports spurs 16 and center point 14 as well as the adjustment mechanisms for both. Spurs 16 are also commonly referred to as driving dogs, prongs, or driving members. Center point 14 is centered within head 11 and radially surrounded by preferably four spurs 16.

Adjustable center point 14 is preferably about 1 ⅝ inches long and ⅜ inches in diameter. In this setup, the distance of center point 14 which protrudes from head 11 is adjusted by manually turning adjusting screw 18. Screw 18 is adjacent to the interior end 52 of center point 14. Screw 18 has a 90 degree adjusting point. The interior end 52 of center point 14 is cut on a 45 degree angle. The cone of adjusting screw 18 makes contact with the interior end 52 of center point 14. This allows for approximately ⅜ inch of axial movement of the center point 14, as adjusting screw 18 is rotated through approximately eight turns. This mechanism also permits retraction of center point 14 by backing out adjusting screw 18 while advancing the tailstock ram, thus enabling spurs 16 to fully engage the workpiece.

Dog point screw 20 is threaded into body 12 until it engages in milled slot 40 allowing axial movement within prescribed limits while preventing center point 14 from rotating. Milled slot 40 is preferably about ½ inches long and 5/32 inches in width and about 0.130 inches deep. Center point 14 preferably has a 60 degree angle at the exterior end 50. This allows for greater accuracy in repositioning the workpiece. Since it is such an easy matter to change center points, several versions, each having a different angle at the exterior end 50 could be provided so that the point exactly matches a particular type of workpiece or cutting situation.

In operation, spur center 10 is used by first extending center point 14 to the desired position. The workpiece is then mounted between the center point 14 and the tailstock center point so that the spurs are not engaged. The lathe is then started and the workpiece is driven by the friction of the center point only. Centering tests are performed and the rotational center is adjusted by bumping the workpiece with a mallet against the center points (either the spur center or the tailstock). After each adjustment, the tailstock ram is retightened. Once the workpiece is satisfactorily centered, centering point 14 is retracted until spurs 16 engage. A slight pressure is still maintained on the center point, as it plays some role in maintaining position, especially if the end of the work is rough and all four spurs 16 are not fully engaged.

Figure 3:
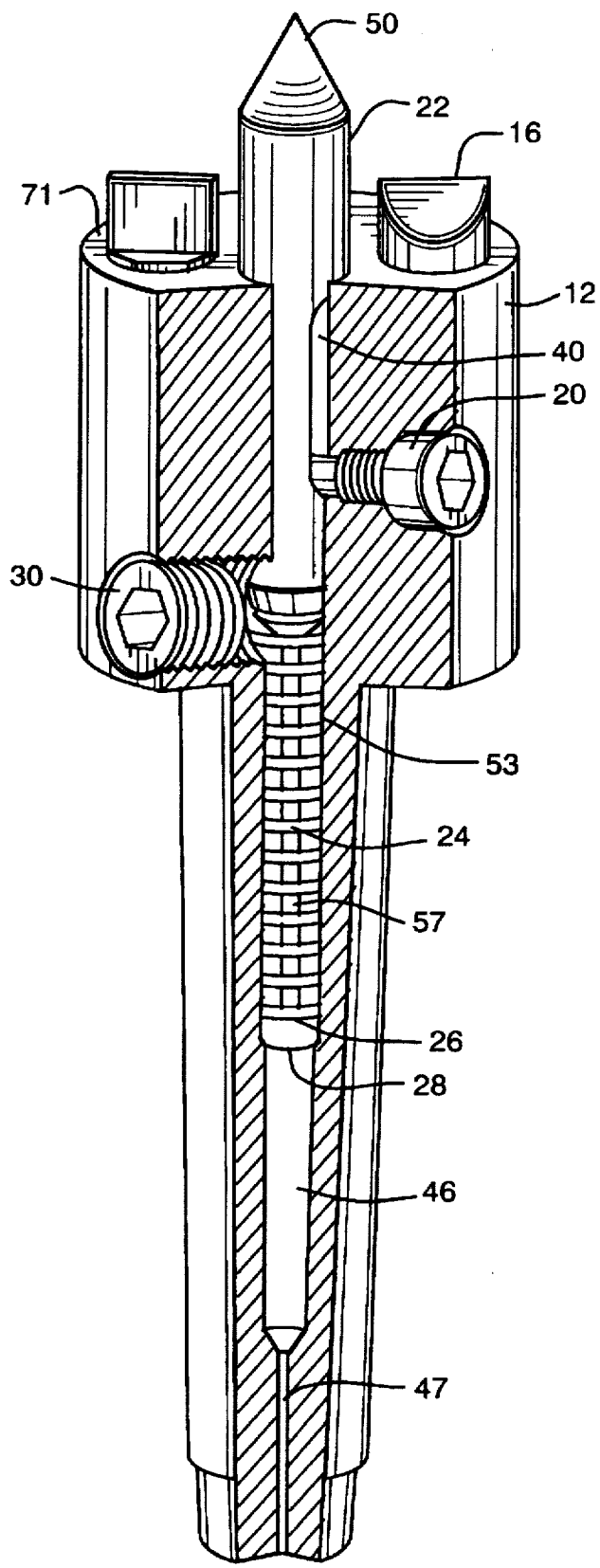
FIG. 3 is a partial cut away view of the spur center apparatus with the spring-loaded center point.

FIG. 3 is a partial cut away view of the spur center 10 with the spring-loaded center point 22 installed. Center point 22 is preferably about 1 ⅛ inches long, and has a ⅜ inch diameter. Milled slot 40 is similarly dimensioned and positioned as with center point 14. However, its length can be extended slightly if desired. A centered threaded hole (not shown) is provided at the bottom which serves to attach cap screw 57 to the center point 22.

As with the adjustable center point 14, dog point screw 20 is threaded into body 12 until it engages in milled slot 40 allowing axial movement within prescribed limits while preventing center point 22 from rotating.

Using spring-loaded center point 22, the extension of center point 22 is determined by spring 24 rather than having an adjustment with adjustment screw 18. Bore 53 extends axially through the length of body 12 in spur center 10. The preferable diameter of bore 53 from face 71 to shoulder 45 is about ⅜ inches to accommodate center points 14 and 22. The preferable diameter of bore 53 in region 46 (about 1 inch long) is about 5/16 inches and in region 47 is about ⅛ inches. Washer 26 seats against the step 45 of bore 53. Washer 26 is placed on cap screw 57 and spring 24 is then slid onto cap screw 57. Washer 26 holds spring 24 in position so that spring 24 is compressed when a force exceeding the spring tension of spring 24 is placed on end 50. As noted above, cap screw 57 is attached to center point 22 via a threaded hole. Also, by providing center point 22 as a captive unit, spring 24 cannot "shoot" when dog point screw 20 is released.

Dust plug 30 replaces screw 18 when center point 22 is used since screw 18 is unnecessary. Dust plug 30 keeps lubricant in and dirt out of the working parts within the body 12.

In operation, workpieces can be safely removed and replaced with the spindle in motion. The operator merely backs off the tailstock ram until the center point 22 pushes the workpiece away from spurs 16 which allows its rotation to be stopped and the workpiece can be removed. To install, merely reverse the procedure. This ability is particularly useful in situations where workpieces do not have to be precisely centered and there is no need for testing or adjustment. This type of work includes chair parts and other pieces which do not have a square section. Another useful situation is when the exact location of the center has been fixed in the work piece and the spring center point 22 is used for second and subsequent operations. This type of work includes cutting and testing tenons, sanding or any other kind of repetitive work where the workpiece must be frequently removed and inserted.

Figure 4:
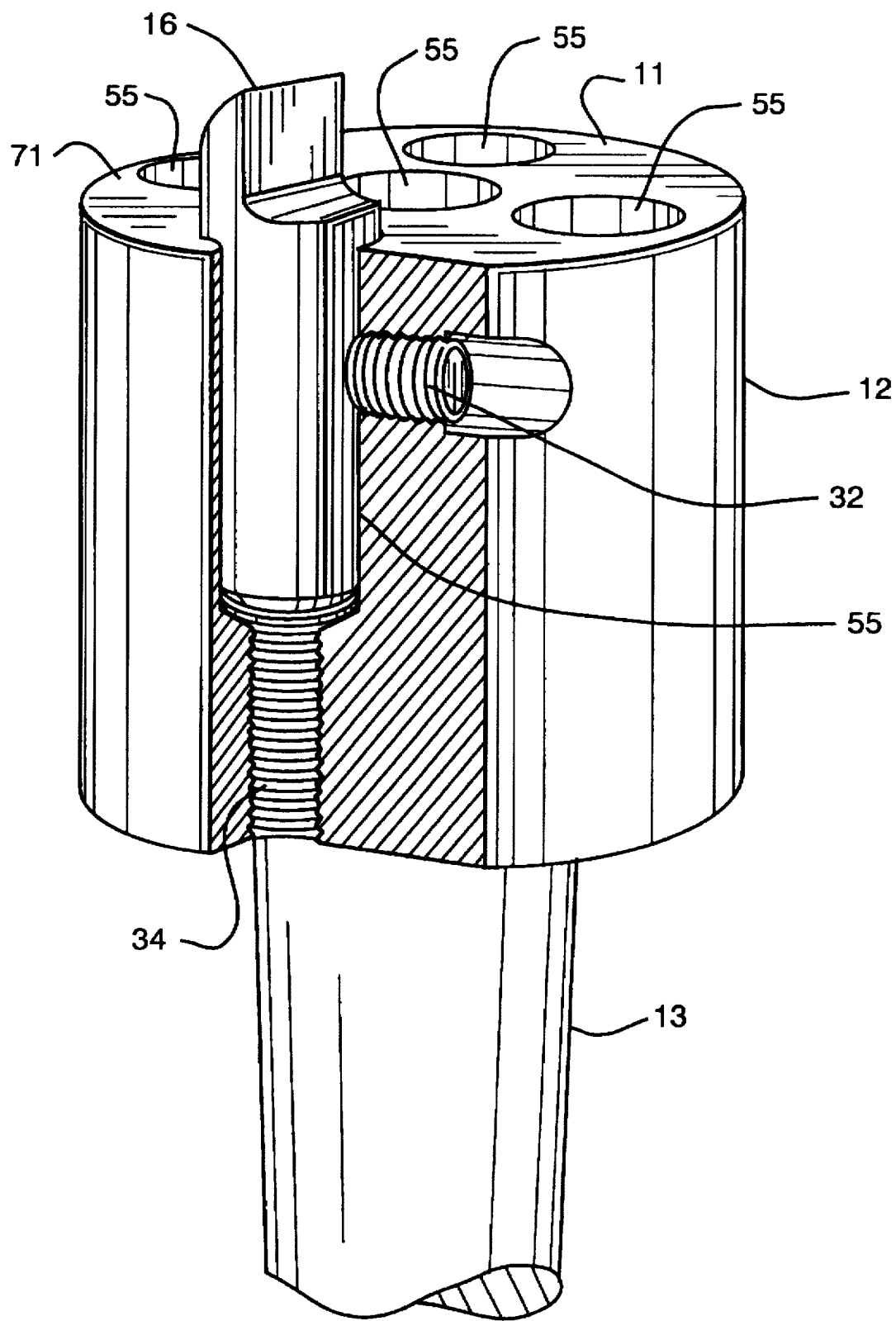
FIG. 4 is a partial cut away view showing a spur and its adjustment mechanism in detail.

FIG. 4 is a partial cut away view showing a spur and its adjustment mechanism in detail. Spurs 16 are preferably about 1 inch long, fabricated from ⅛ inch drill rod. A flat is machined on spur 16 which serves to receive set screw 32 that locks spur 16 in place once the height above face 71 has been adjusted via push screw 34. The face of spur 16 is preferably cylindrical in shape with an edge formed on the point. The front face of the edge is parallel to the axis with a trailing edge cut at 45 degrees. As noted, each spur 16 is individually adjusted by a push screw 34. This allows precise setting of the length so all spurs project the same amount. Set screw 32 further positions spur 16 to keep the edge oriented radially. The apparatus will preferably accommodate four spurs. However, this apparatus may also be used with only two spurs by removing excess spurs. Spurs may also be removed for resharpening or replacement. Further, customized spurs, differing from standard spurs either in composition or geometry, can be substituted for spurs 16 when a special need is encountered such as attempting to hold plastic workpieces.

Figure 5:
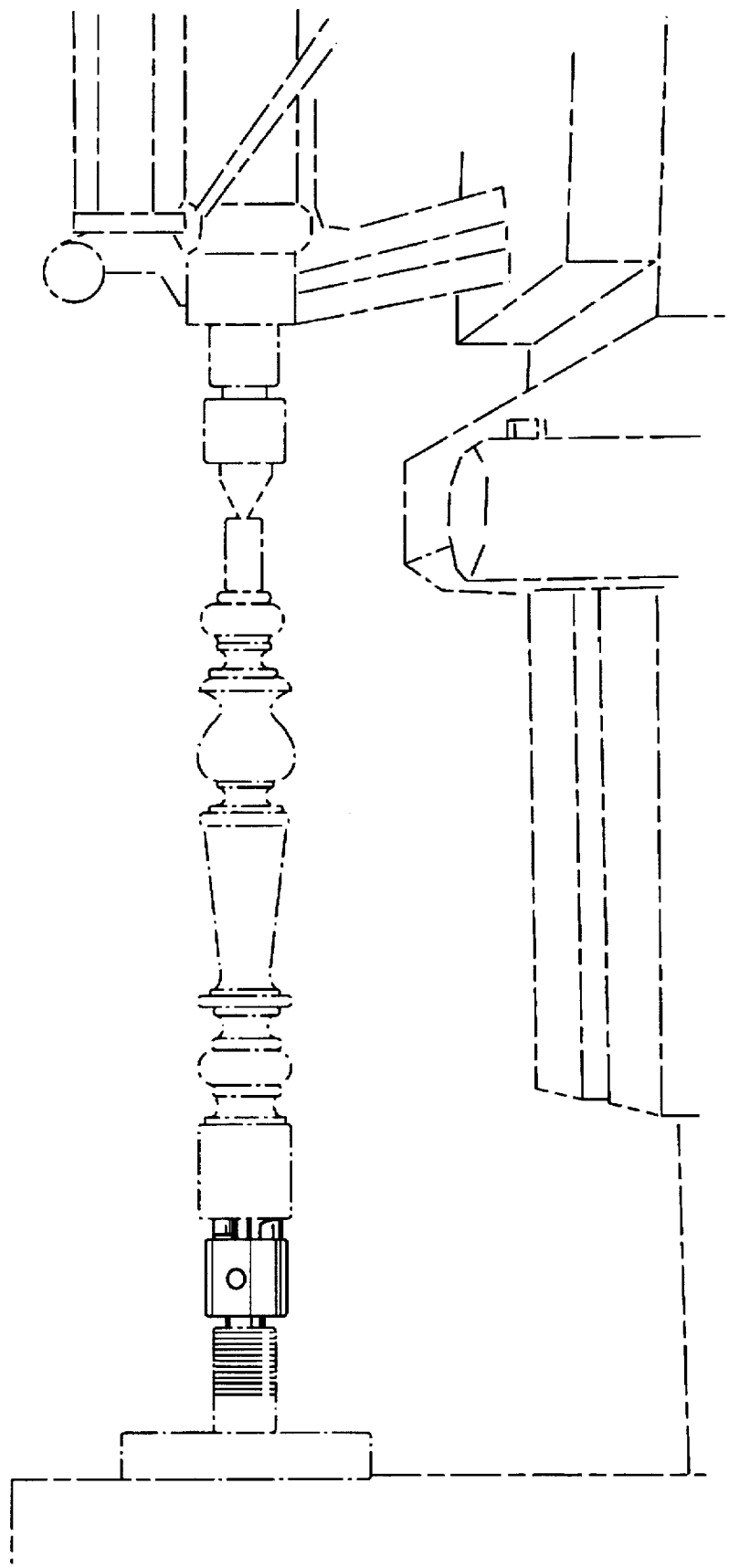
FIG. 5 is a side view of the invention installed on a typical lathe with the invention being used to hold a typical workpiece.

FIG. 5 is a side view of the invention installed on a typical lathe with the invention being used to hold a typical workpiece.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A spur center for use with a lathe machine having a headstock and a tailstock, said spur center comprising:

a head having a workpiece face, a shank dimensioned to correspond to a Morse Taper size, said shank connected to said head, a center bore extending axially from the workpiece face of said head through shank, a plurality of spur bores in the workpiece face of said head, radially located equidistant from the center bore, a center point having a point end, an angled end and a milled slot, said center point dimensioned to adjustably fit within the center bore such that the point end of said center point exits from the workpiece face of said head, a dog point screw attached to said head and dimensioned to fit within said milled slot, wherein once said dog point screw is engaged, said center point is prevented from rotating within said head, an adjustment screw having an angled point with an angle corresponding to the angled end of said center point, such that when said adjustment screw is turned in, the angled point of said adjustment screw contacts the angled end of said center point causing the point end of said center point to axially move away from the workpiece face of said head and such that when said adjustment screw is turned out and the tailstock of said lathe is advanced, the point end of said center axially moves toward the workpiece face of said head.

2. The spur center of claim 1 wherein approximately eight turns of said adjustment screw provides a range of adjustment from the maximum to the minimum distance of the pointed end of said center point relative to the workpiece face of said head.

3. The spur center of claim 1 further comprising at least two spurs, each dimensioned to fit into one of the spur bores in said head, wherein each of said spurs being substantially cylindrical in shape with a predetermined flat provided thereon, each of said spurs having an engagement end that will hold a workpiece from rotating when the engagement end of said spur engages said workpiece, at least two push screws positioned within said head, one for each spur such that when one of said push screws is turned, an axial adjustment of said spur is provided, that is, the engagement end of the corresponding spur is moved closer or further away from the workpiece face of said head, at least two set screws positioned with said head, one for each spur such that when the axial adjustment of said spur has been accomplished, each of said set screws is tightened against the flat of its corresponding spur to hold said position firmly in the adjusted position without moving axially or rotationally.

4. The spur center of claim 3, wherein each of said spurs have an engagement end formed by the intersection of a vertical flat face and a trailing surface receding at a predetermined angle.

5. A spur center for use with a lathe machine having a headstock and a tailstock, said spur center comprising:

a head having a workpiece face, a shank dimensioned to correspond to a Morse Taper size, said shank connected to said head, a center bore extending axially from the workpiece face of said head through shank, the center bore having a shoulder positioned at a predetermined distance from the workpiece face of said head, a plurality of spur bores in the workpiece face of said head, radially located equidistant from the center bore, a center point having a point end, a threaded end and a milled slot, said center point dimensioned to adjustably fit within the center bore such that the point end of said center point exits from the workpiece face of said head, a dog point screw threadably attached to said head and dimensioned to fit within said milled slot, wherein once said dog point screw is engaged, said center point is prevented from rotating within said head, a spring-loaded assembly attached to said threaded end of said center point, such that said spring-loaded assembly attached to said center point provides a spring-loaded center point wherein any force greater than a predetermined amount causes the point end of said spring-loaded center point to move toward the workpiece face of said head and any force less than said predetermined amount cause the pointed end of said spring-loaded center point to move away from the workpiece face of said head.

6. The spur center of claim 5 further comprising at least two spurs, each dimensioned to fit into one of the spur bores in said head, wherein each of said spurs being substantially cylindrical in shape with a predetermined flat provided thereon, each of said spurs having an engagement end that will hold a workpiece from rotating when the engagement end of said spur engages said workpiece, at least two push screws positioned within said head, one for each spur such that when one of said push screws is turned, an axial adjustment of said spur is provided, that is, the engagement end of the corresponding spur is moved closer or further away from the workpiece face of said head, at least two set screws positioned with said head, one for each spur such that when the axial adjustment of said spur has been accomplished, each of said set screws is tightened against the flat of its corresponding spur to hold said position firmly in the adjusted position without moving axially or rotationally.

* * * * *